(12) United States Patent
Truong et al.

(10) Patent No.: US 9,494,970 B2
(45) Date of Patent: Nov. 15, 2016

(54) DIRECTION BASED USER INTERFACE AND DIGITAL SIGN DISPLAY

(75) Inventors: Binh T Truong, Houston, TX (US); Nam Nguyen, Houston, TX (US); Kent E Biggs, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 278 days.

(21) Appl. No.: 13/562,032

(22) Filed: Jul. 30, 2012

(65) Prior Publication Data

US 2014/0028541 A1    Jan. 30, 2014

(51) Int. Cl.
*G06F 1/00* (2006.01)
*G06F 1/16* (2006.01)
*G06F 3/0487* (2013.01)

(52) U.S. Cl.
CPC ........... *G06F 1/1601* (2013.01); *G06F 3/0487* (2013.01); *G06F 2200/1614* (2013.01)

(58) Field of Classification Search
CPC ... G09G 2300/04; G06F 1/00; G06F 3/0416; G06F 3/0412; G06F 3/044
See application file for complete search history.

(56) References Cited

U.S. PATENT DOCUMENTS

| | | |
|---|---|---|
| 2004/0230482 A1 | 11/2004 | Hendrickson |
| 2008/0086378 A1 | 4/2008 | Reddy |
| 2010/0262504 A1* | 10/2010 | Tamura ........................ 705/24 |
| 2011/0030252 A1 | 2/2011 | Marinakis |
| 2011/0226854 A1 | 9/2011 | Stoudt et al. |
| 2011/0288915 A1 | 11/2011 | Mochizuki |
| 2013/0153656 A1* | 6/2013 | Skiles ........................ 235/383 |

OTHER PUBLICATIONS

POS-25 15" All-in-one Touch POS System, 2008, 5 pages, Broadax Systems, Inc., City of Industry, California, USA.

* cited by examiner

*Primary Examiner* — Michael Faragalla
(74) *Attorney, Agent, or Firm* — Mahamedi IP Law LLP

(57) ABSTRACT

Examples disclosed herein relate to a direction based user interface and digital sign display. A processor may detect a facing direction of a display device. The processor may cause a user interface to be displayed on the display device if the display device is detected to be facing a first direction. The processor may cause a digital sign image to be displayed on the display device if the display device is detected to be facing a second direction.

15 Claims, 5 Drawing Sheets

DIRECTION BASED USER INTERFACE AND DIGITAL SIGN DISPLAY

BACKGROUND

A display device, such as a monitor, may display a user interface to allow a user to interact with an electronic device. For example, a user may provide input to the user interface with touch, gesture, or peripheral device input. A user interface may be related to, for example, a computing application for a retail point of sale to allow purchase of a retail item.

BRIEF DESCRIPTION OF THE DRAWINGS

The drawings describe example embodiments. The following detailed description references the drawings, wherein.

DETAILED DESCRIPTION

A display device may be used to display information related to different computing applications. In one implementation, a display device may display a user interface to allow a user to interact with the display device or a digital sign providing information to a viewer depending on the facing direction of the display device. The display device or a processor associated with the display device may detect the facing direction of the display device and automatically update the application displayed on the display device based on the detected facing direction.

A display device may be used for different purposes based on the computing application displaying information on the display device. The facing direction of the display device may in some cases indicate information about the viewers or use of the display device. For example, in a first facing direction the display device may be in a position to face a small area for use by an individual or small group, and in a second facing direction the display device may face an open area where many viewers may see the display device. In one implementation, an administrator may enter settings for the display device to indicate a facing direction to associate with a user interface and a second facing direction to associate with a digital sign such that the display device may then automatically display a user interface or digital sign based on the settings and the facing direction of the display device.

As an example, a display device may be associated with a retail point of sale. The display device may be associated with a cashier checkout or self-checkout. When facing a first direction towards a cashier or a self-checkout user, the display device may display a user interface for conducting the retail transaction. A user may turn, flip, or otherwise reposition the display device such that it faces a different direction, and the display device may automatically display a digital sign. The display device may be positioned such that it faces a direction viewable by more people where it automatically becomes a digital sign.

A retail point of sale display device that changes purposes automatically based on the facing direction may allow a retail worker to quickly change the display on the display device by changing the direction of the display. It may allow a display device used for a retail point of sale to more easily serve an additional purpose as a digital sign.

Figure 1:
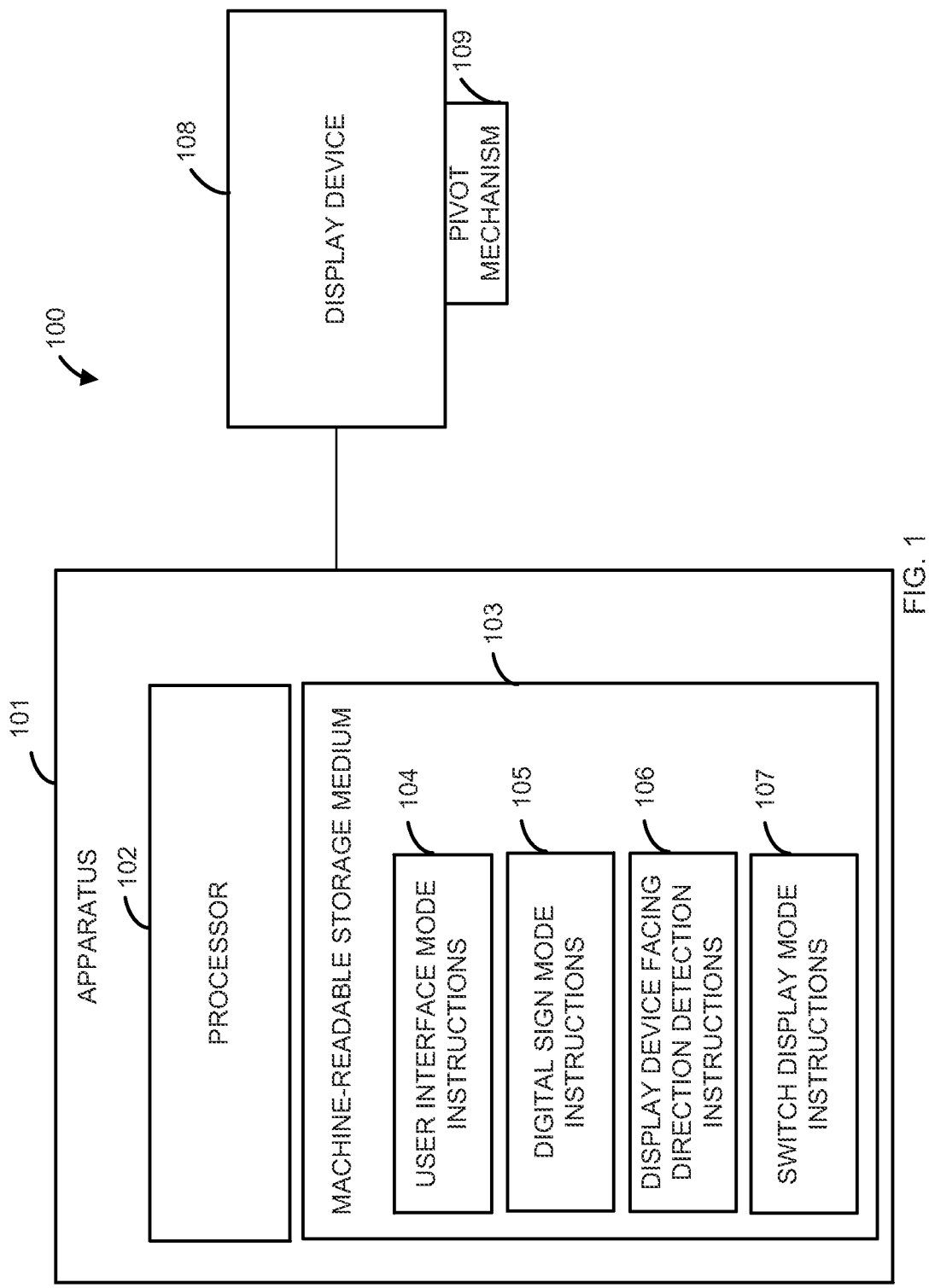
FIG. 1 is a block diagram illustrating one example of a computing system to change an image on a display device between a digital sign and user interface based on the facing direction of the display device.

FIG. 1 is a block diagram illustrating one example of a computing system 100 to changing an image on a display device 108 between a digital sign and user interface based on the facing direction of the display device 108. For example, the display device 108 may face west and display a digital sign. When the display device 108 is repositioned to face east, it may automatically switch to display a user interface.

The computing system 100 may include an apparatus 101, the display device 108, and a pivot mechanism 109. The display device 108 may be any suitable display device, such as an LCD, touch screen, CRT, flat panel display, LED display, plasma display, or OLED display. In one implementation, the display device 108 and apparatus 101 are combined, such as in a tablet computer, mobile phone, or all-in-one computer. The display device 108 may display an image to a user on one side of the display device. The display device 108 may move so that the displaying side of the display device faces different directions, such as by use of the pivot mechanism 109. The pivot mechanism 109 may be any mechanism to allow the display device 108 to move to face a different direction. For example, the pivot mechanism 109 may be a ball joint. The display device 108 may rotate around the pivot mechanism 109 to face different directions. In one implementation, the display device 108 may flip to face a different direction.

The apparatus 101 may include a processor 102 and a machine-readable storage medium 103. The processor 102 may be a processor, such as a central processing unit (CPU), a semiconductor-based microprocessor, or any other device suitable for retrieval and execution of instructions. In one implementation, the processor 102 includes logic instead of or in addition to a processor. As an alternative or in addition to fetching, decoding, and executing instructions, the processor 102 may include one or more integrated circuits (ICs) or other electronic circuits that comprise a plurality of electronic components for performing the functionality described below. The functionality described below may be performed by multiple processors.

The processor 102 may communicate with the machine-readable storage medium 103. The machine-readable storage medium 103 may be any suitable machine readable medium, such as an electronic, magnetic, optical, or other physical storage device that stores executable instructions or other data (e.g., a hard disk drive, random access memory, flash memory, etc.). The machine-readable storage medium 103 may be, for example, a computer readable non-transitory medium.

The machine-readable storage medium 103 may include user interface mode instructions 104, digital sign mode instructions 105, display device facing direction detection instructions 106, and switch display mode instructions 107. The display device 108 may display a particular image based on the mode. The display device 108 may operate in a user interface mode and a digital sign mode depending on the facing direction of the display device 108.

The user interface mode instructions 104 may include instructions to display a user interface on the display device 108. The user interface may be associated with a computing application executing on the apparatus 101. A single or multiple computing applications may be associated with the user interface mode. For example, when the display device 108 switches to user interface mode one of the computing applications may be selected. In one implementation, different facing directions may be associated with different computing applications. For example, a southeast facing display may be associated with a first computing application and an east facing display may be associated with a second computing application. In one implementation, a range may be associated with the user interface mode or a particular computing application of the user interface mode such that the associated user interface is displayed when the facing direction is in the particular range.

The digital sign mode instructions 105 may include instructions to display a digital sign on the display device 108. The digital sign mode instructions 105 may include instructions to display a single sign or to display multiple signs, such as switching signs after a period of time or based on the particular facing direction of the display device 108.

The display device facing direction detection instructions 106 may include instructions for determining the facing direction of the display device 108. For example, the facing direction may be based on information from a sensor, such as a G-sensor, accelerometer, inclinometer, motion sensor, and/or a connector inside the pivot mechanism 109.

The switch display mode instructions 107 may include instructions from switching between the user interface mode and the digital sign mode based on information about the facing direction of the display device 108. The switch display mode instructions 107 may switch the mode when information is provided about a facing direction change is detected, or the instructions may periodically check a variable or poll the display device 108 to determine the facing direction of the display device 108. The information about the facing direction of the display device 108 may be compared to stored information about a user interface or digital sign associated with the facing direction or a range of facing directions. The user interface mode instructions 104 or the digital sign mode instructions 105 may be executed based on the mode associated with the determined facing direction.

Figure 2:
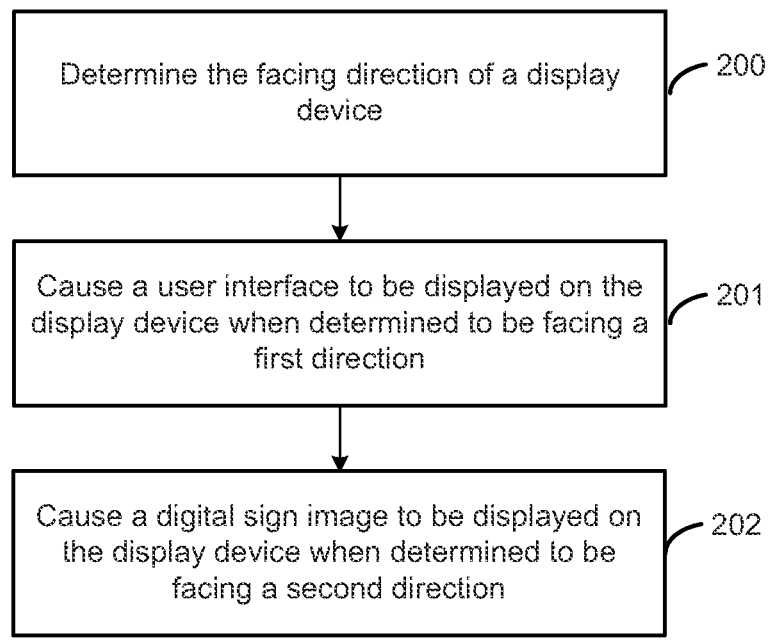
FIG. 2 is a flow chart illustrating one example of a method to determine whether to display a user interface or a digital sign on a display device based on the facing direction of the display device.

FIG. 2 is a flow chart illustrating one example of a method to determine whether to display a user interface or a digital sign on a display device based on the facing direction of the display device. The display device may display a user interface for allowing user interaction with a computing application or a digital sign for displaying an image of a sign. The display device may automatically switch between the user interface and the digital sign based on the facing direction of the display device. The facing direction of the display device may be determined, for example, based on a sensor associated with the display device. The method may be implemented by the processor 101 of FIG. 1.

Beginning at 200, a processor determines the facing direction of a display device. The display device may change facing directions in any suitable manner. The display device may flip, spin, or be otherwise repositioned, for example, along a swivel or other mechanism. The processor may determine the facing direction based on information from a sensor. The sensor may, for example, a G sensor, accelerometer, camera, or a sensor associated with a connector in a swivel mechanism. The processor may receive information from the sensor, request information from the sensor, or access stored information associated with the sensor indicating the facing direction of the display device. The processor may determine which of a plurality of directions a display device is facing or more exact information about the facing direction. As an example, the display device may have two modes, and a facing direction between two degrees may be associated with the first mode and other facing direction may be associated with a second mode.

Continuing to 201, the processor causes a user interface to be displayed on the display device when determined to be facing a first direction. In one implementation, the processor launches a computing application when the display device is determined to be facing the first direction, and a user interface associated with the computing application may be displayed. The processor may choose which of a group of computing applications to execute. The determination may be made automatically, such as based on the time of day, day of the week, more precise information about the facing direction or based on user input. The user interface associated with the computing application may provide information to the user and allow the user to interact with the user interface, such as through touch, gesture, or peripheral device.

Proceeding to 202, the processor causes a digital sign image to be displayed on the display device when determined to be facing a second direction. The processor may receive information from a sensor or access stored information indicating a change in facing direction. The processor may display a digital sign associated with the second facing direction. The digital sign may switch images after a period of time such that each image is displayed for a particular period of time before switching to the next image. In one implementation, the digital sign may provide a still image, audio, and/or video.

The processor may select the digital sign from a group of digital signs. The processor may select which digital sign to display based on the horizontal and vertical positioning of the display device. The horizontal and vertical positioning of the display device may be changed when the display device rotated such that an edge along the x-axis is moved along the y-axis. For example, a first advertisement may be for a horizontal orientation and a second advertisement may be for a vertical positioning, such as where the features of the image are positioned differently based on the dimensions and orientation of the display device. In one implementation, the digital sign may be selected based on the facing direction of the display device. For example, a facing direction within a particular range may indicate a digital sign mode, and different digital sign images may be associated with different positions within the range. User input or stored information may indicate which digital sign to display. For example, a different digital sign may be displayed based on the amount of time the user interface was in use or how the user interface was used.

In one implementation, the processor may switch between modes based on additional criteria than the facing direction of the display device. For example, the mode may switch when the facing direction changes, and the mode may change again while the display device remains in the same facing direction, depending on whether the additional criteria are met. For example, the display device may switch modes based on user input. The display device may switch from the user interface mode to the digital sign mode where the user interface has not interacted with for greater than a period of time.

Figure 3A:
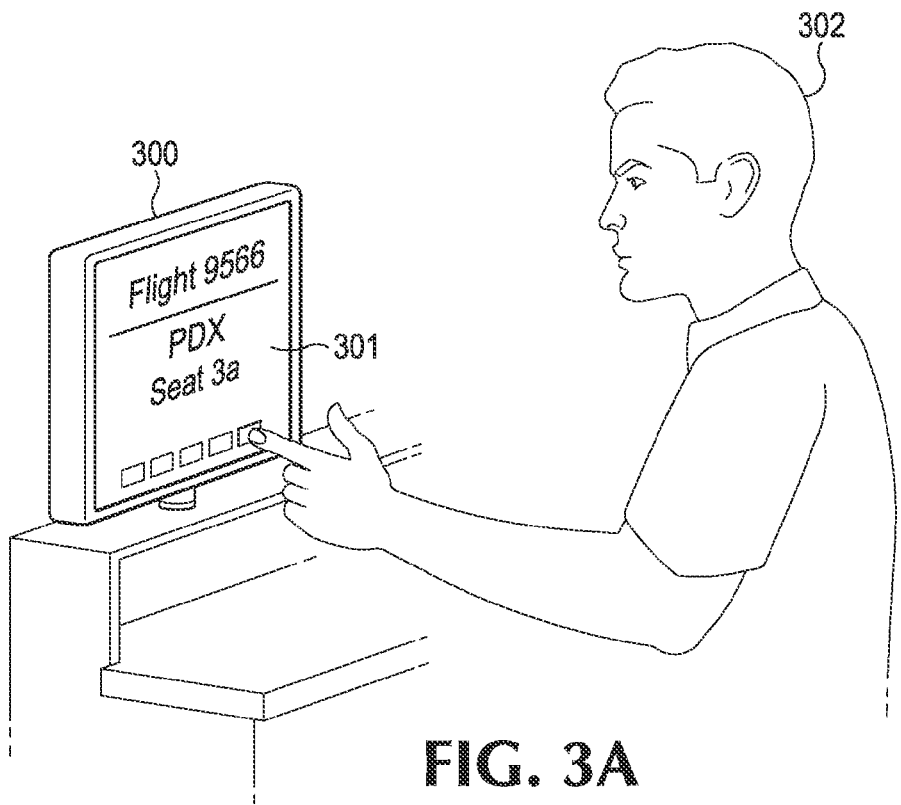
FIGS. 3A and 3B illustrate one example of a display device switching between a user interface and digital sign mode based on the facing direction of the display device.
Figure 3B:
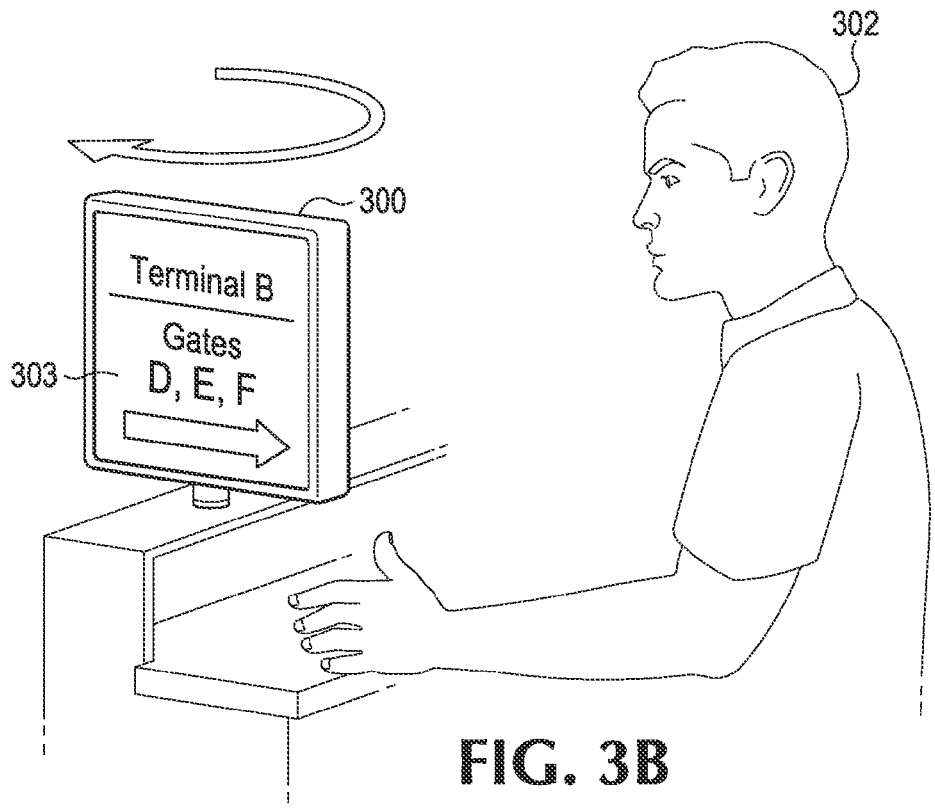

FIGS. 3A and 3B illustrate one example of a display device switching between a user interface and digital sign mode based on the facing direction of the display device. FIGS. 3A and 3B illustrate an application of the display device in an airport setting. In FIG. 3A, a display device 300 displays a user interface 301 to a user 302. The user interface 301 displays information about changing airline seats to the user 302, and the user 302 touches the user interface 301 to provide information to the computing application about the seating information.

The user 302 may then turn the display device 300 such that it faces a different direction. For example, an airport employee may use the user interface on the display device 300 and then reposition the display device 300 to face out into the airport. The display device 300 may automatically update its display based on the facing direction such that the user 302 does not provide other input about an instruction to switch modes to a digital sign mode. In FIG. 3B the display device 300 faces the second direction and a digital sign 303 is displayed on the display device 300. The digital sign 303 shows information that may be valuable to airport patrons walking past the display device 300.

In some implementations, an override feature may be included that allows a user to at least temporarily override the currently displayed item. For example, a user may not want digital signage provided when the display is repositioned. The user may therefore select the override option which may allow the user to override the automatically displayed content and instead display other content (e.g., the content displayed before the repositioning).

Figure 4A:
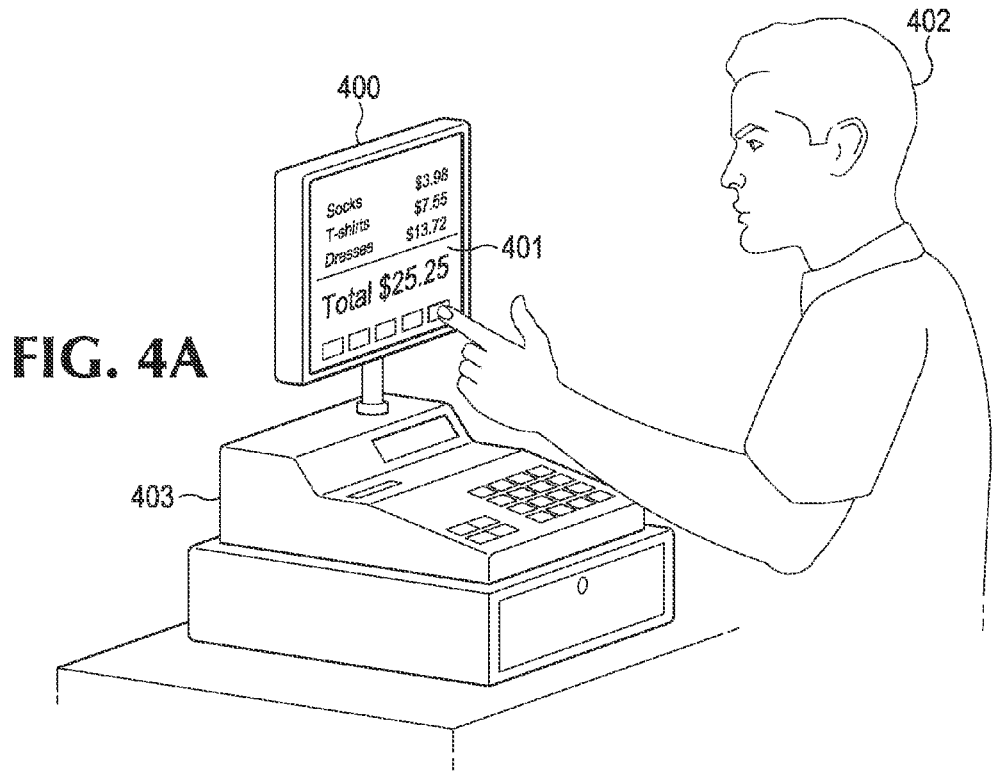
FIGS. 4A and 4B illustrate one example of a display device switching between a user interface and digital sign mode based on the facing direction of the display device in a retail point of sale setting.
Figure 4B:
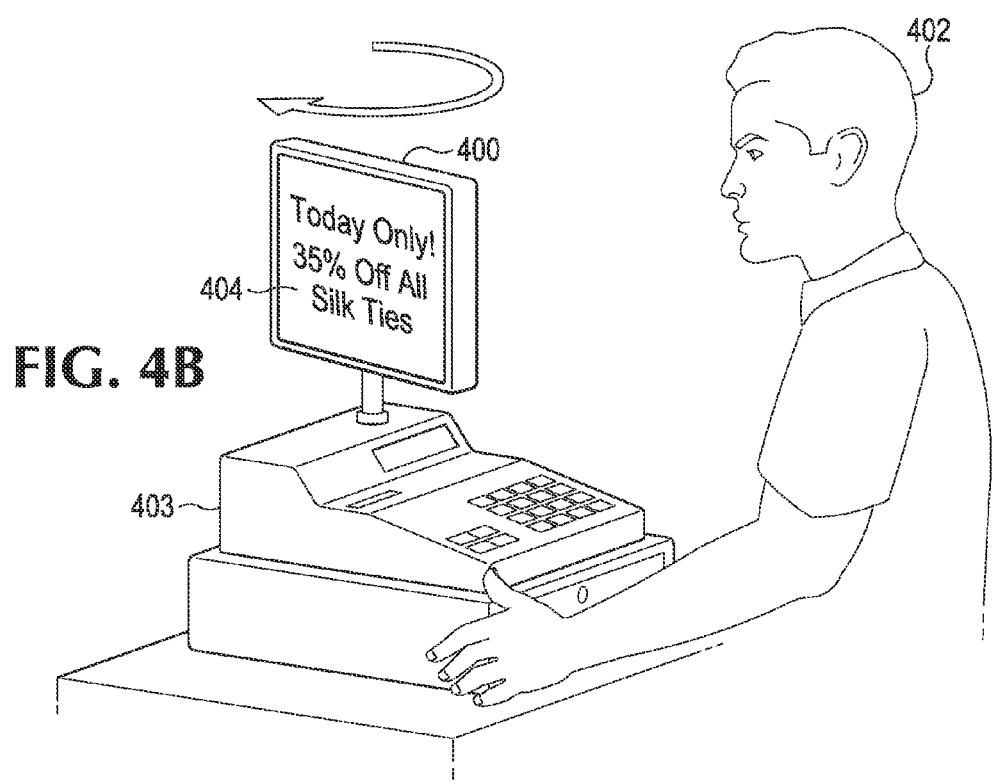

FIGS. 4A and 4B illustrate one example of a display device switching between a user interface and digital sign mode based on the facing direction of the display device in a retail point of sale setting. In FIG. 4A, a display device 400 displays a user interface 401 for communicating sales information to user 402. The user 402 may use the cash register 403 to perform the sale, and the user interface 402 may indicate information about the sale, such as items purchased or purchase price.

A processor associated with the display device 400 may detect a change in facing direction of the display device 400. In FIG. 4B, the display device 400 faces a different direction than in FIG. 4A, and the display device 400 is automatically updated to display a digital sign 404. The digital sign 404 may display information related to, for example, sales, store hours, store floor plan, and other information.

In one implementation, the display device 400 may have a third self-checkout mode where the display device automatically displays a self-checkout user interface when the display device 400 is determined to be facing a particular direction. The self-checkout user interface may be a user interface for allowing a customer to perform the retail transaction, such as where the customer scans items and then provides payment authorization through the user interface. The display device 400 may switch to the third mode based on any suitable criteria, such as based on user input, the time of day, the day of week, or the time since last use of the display device 400. The facing direction of the display device 400 may be divided into three ranges where the first applies to the retail point of sale cashier user interface, the second applies to a retail point of sale self-checkout, and the third applies to a digital sign. The display device 400 may switch between the three modes based on the facing direction. In one implementation, a first facing direction is associated with a retail point of sale cashier user interface and a second facing direction is associated with both a digital sign and a retail point of sale self-checkout user interface. For example, the display device 400 may automatically become a digital sign when the facing direction changes and switch to a self-checkout based on user input.

Figure 5:
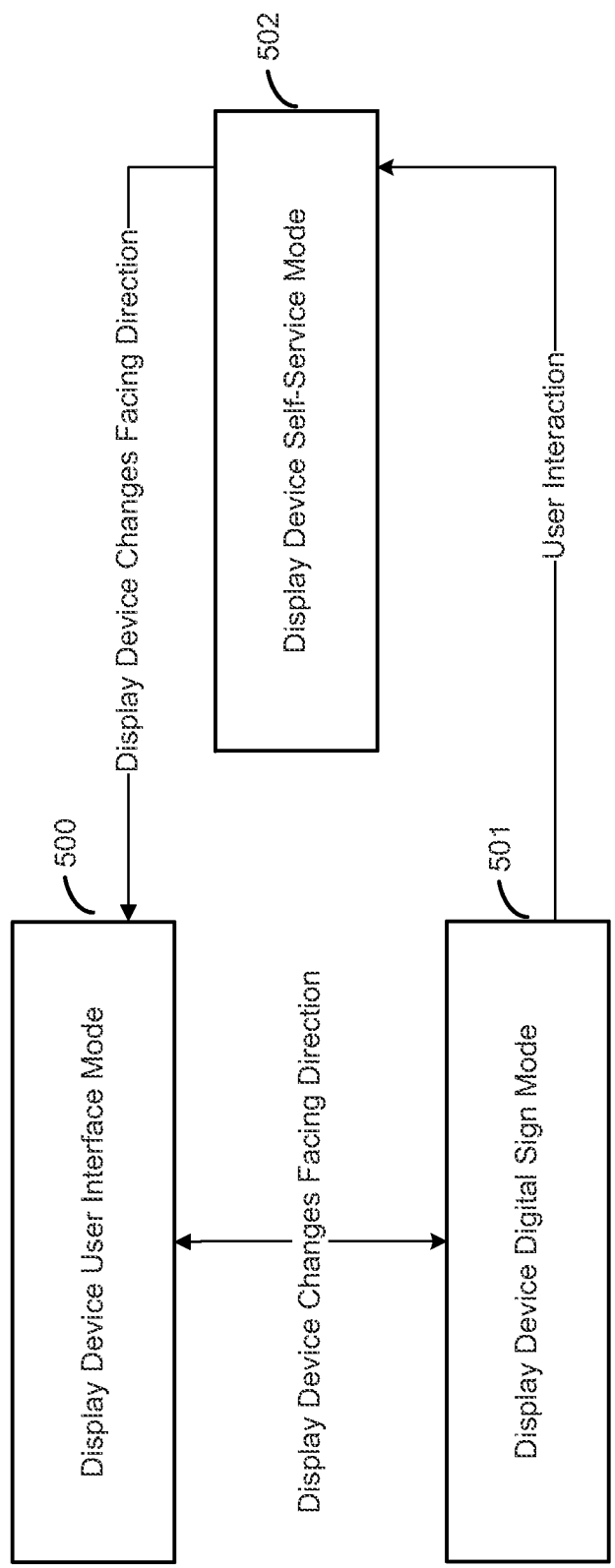
FIG. 5 is a diagram illustrating one example of a display device capable of operating in a first user interface mode, a second digital sign mode, and a third self-service mode.

FIG. 5 is a diagram illustrating one example of a display device capable of operating in a first user interface mode, a second digital sign mode, and a third self-service mode. The display device may switch between modes automatically. For example, the display device may operate in a user interface mode 500 to allow an individual to interact with the display device, such as a cashier or other worker. The display device may switch to a digital sign mode 501 in response to a change in facing direction of the display device, and the display device may switch from the digital sign mode 501 back to the user interface mode 500 if the display device changes back to the facing direction associated with the user interface mode 500. From the digital sign mode 501, the display device may automatically switch to a self-service mode 502 in response to a user interaction with the display device, such as through touch, a peripheral device, gesture, or gaze. The display device may switch to the self-service mode 502, for example, if detected that a person is within a particular distance of the display device. The digital sign mode 501 may be used to attract viewers, such as through displaying advertisements, and the self-service mode 502 may allow a viewer attracted to the digital sign to receive more information or conduct a transaction based on the information provided by the digital sign.

The display device may return to the digital sign mode 501 from the self-service mode 502, such as where a user has not interacted with the display device for a period of time or where a button or other input selection item indicates the change should occur. The display device may change from the self-service mode 502 to the user interface mode 500 if the display device changes facing directions. For example, a first facing direction may be associated with the user interface mode 500, and a second facing direction may be associated with both the digital sign mode 501 and the self-service mode 502. A different criterion in addition to facing direction may be used to determine whether to display the digital sign mode 501 or the self-service mode 502 when the display device is in the facing direction associated with the digital sign mode 501 and the self-service mode 502. The automatic change between the different modes may allow the display device to be more easily used for different purposes.

The invention claimed is:

1. A computing system, comprising:
   a display device;
   a pivot mechanism to pivot the display device in a number of facing directions;
   a processor; and
   one or more memory resources storing instructions that, when executed by the processor, cause the computing system to:
   based on a first facing direction of the display device, initiate a first mode to display a cashier interface on the display device, the cashier interface enabling point of sale functions by which user entry of information is permitted on the display device;
   detect a change from the first facing direction to a second facing direction by the display device;
   in response to detecting the change to the second facing direction, initiate a second mode to display a digital sign image on the display device and disable user entry of information on the display device; and
   in response to a user input on the digital sign image in the second facing direction, initiate a third mode to display a self-checkout interface enabling a customer to perform a retail transaction on the display device.

2. The computing system of claim 1, wherein pivot mechanism comprises a ball joint enabling the pivot mechanism to pivot the display device about a vertical axis and rotate the display device about a horizontal axis, and wherein the executed instructions further cause the processor to:

select the displayed digital sign image from a group of digital sign images based on a rotated orientation of the display device about the horizontal axis.

3. The computing system of claim 1, wherein the executed instructions further cause the processor to:

display the self-checkout interface in response to detecting a presence of the customer when the display device is in the second facing direction.

4. The computing system of claim 1, wherein the executed instructions further cause the processor to:

after displaying the self-checkout interface in the second facing direction for a predetermined period of time without user input, select and display a second digital sign image on the display device.

5. The computing system of claim 1, wherein the processor is to detect the change from the first facing direction to the second facing direction by the display device using a sensor device comprising at least one of a G-sensor, an accelerometer, an inclinometer, or a motion sensor, and wherein the executed instructions further cause the processor to:

using the sensor device, detect a change from the second facing direction to the first facing direction by the display device; and in response to detecting the change to the first facing direction, display the cashier interface on the display device.

6. A method for displaying user interfaces, the method performed by one or more processors of a display device on a pivot mechanism, the method comprising:

based on a first facing direction of the display device, initiating a first mode to display a cashier interface on the display device, the cashier interface enabling point of sale functions by which user entry is permitted on the display device;

detecting a change from the first facing direction to a second facing direction by the display device;

in response to detecting the change to the second facing direction, initiating a second mode to display a digital sign image on the display device and disable user entry of information on the display device; and in response to a user input on the digital sign image in the second facing direction, initiate a third mode to display a self-checkout interface enabling a customer to perform a retail transaction on the display device.

7. The method of claim 6, wherein the pivot mechanism comprises a ball joint enabling the pivot mechanism to pivot the display device about a vertical axis and rotate the display device about a horizontal axis, the method further comprising:

selecting the displayed digital sign image from a group of digital sign images based on a rotated orientation of the display device about the horizontal axis.

8. The method of claim 6, further comprising:

displaying the self-checkout interface in response to detecting a presence of the customer when the display device is in the second facing direction.

9. The method of claim 6, further comprising:

after displaying the self-checkout interface in the second facing direction for a predetermined period of time without user input, selecting and displaying a second digital sign image on the display device.

10. The method of claim 6, wherein detecting the change from the first facing direction to the second facing direction by the display device comprises using a sensor device comprising at least one of a G-sensor, an accelerometer, an inclinometer, or a motion sensor, the method further comprising:

using the sensor device, detecting a change from the second facing direction to the first facing direction by the display device; and in response to detecting the change to the first facing direction, displaying the cashier interface on the display device.

11. A machine-readable non-transitory storage medium comprising instructions that, when executed by a processor of a display device on a pivot mechanism, cause the processor to:

based on a first facing direction of the display device, initiate a first mode to display a cashier interface on the display device, the cashier interface enabling point of sale functions by which user entry of information is permitted on the display device;

detect a change from the first facing direction to a second facing direction by the display device;

in response to detecting the change to the second facing direction, initiate a second mode to display a digital sign image on the display device and disable user entry of information on the display device; and in response to a user input on the digital sign image in the second facing direction, initiate a third mode to display a self-checkout interface enabling a customer to perform a retail transaction on the display device.

12. The machine-readable non-transitory storage medium of claim 11, wherein the pivot mechanism comprises a ball joint enabling the pivot mechanism to pivot display device about a vertical axis and rotate the display device about a horizontal axis, and wherein the executed instructions further cause the processor to:

select the displayed digital sign image from a group of digital sign images based on a rotated orientation of the display device about the horizontal axis.

13. The machine-readable non-transitory storage medium of claim 11, wherein the executed instructions further cause the processor to:

display the self-checkout interface in response to detecting a presence of the customer when the display device is in the second facing direction.

14. The machine-readable non-transitory storage medium of claim 11, wherein the executed instructions further cause the processor to:

after displaying the self-checkout interface in the second facing direction for a predetermined period of time without user input, selecting and displaying a second digital sign image on the display device.

15. The machine-readable non-transitory storage medium of claim 11, wherein the processor is to detect the change from the first facing direction to the second facing direction by the display device using a sensor device comprising at least one of a G-sensor, an accelerometer, an inclinometer, or a motion sensor, and wherein the executed instructions further cause the processor to:

using the sensor device, detect a change from the second facing direction to the first facing direction by the display device; and in response to detecting the change to the first facing direction, display the cashier interface on the display device.

* * * * *